Nov. 12, 1963  M. L. STUPPY  3,110,667
FILTER BOTTOM
Filed Oct. 16, 1959  4 Sheets-Sheet 1
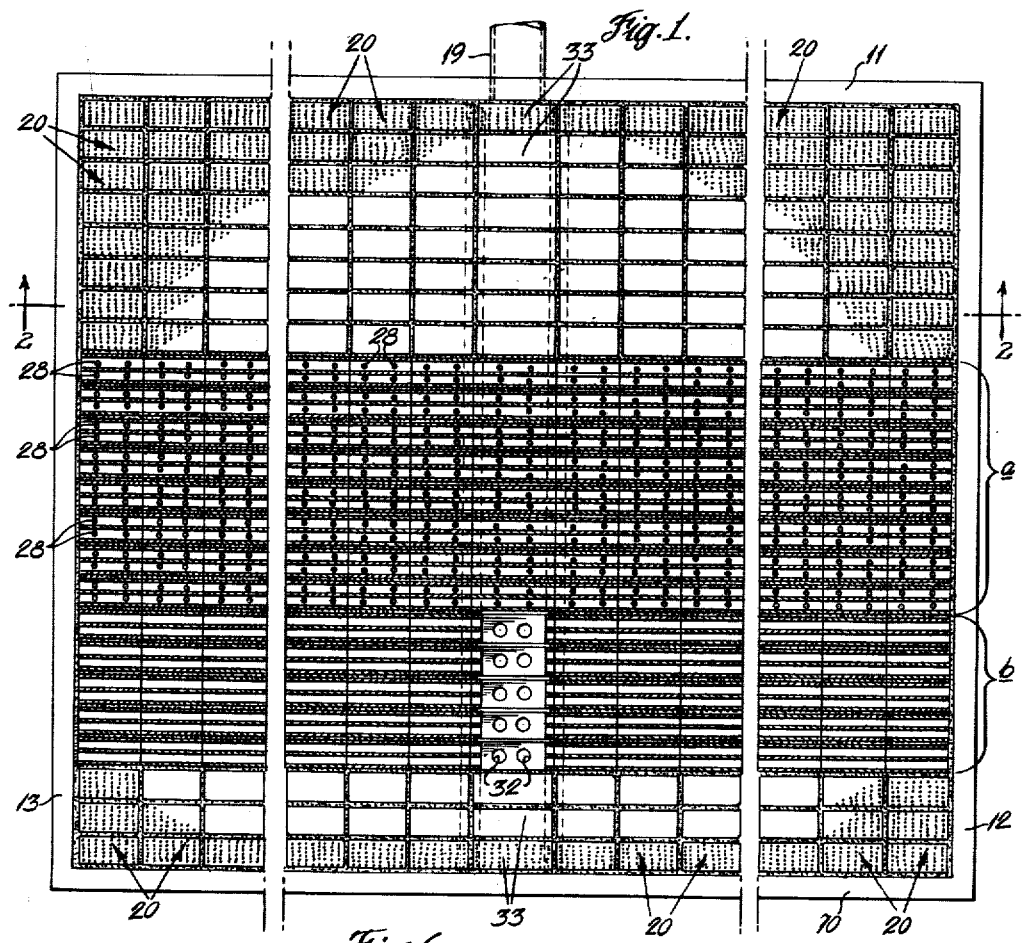
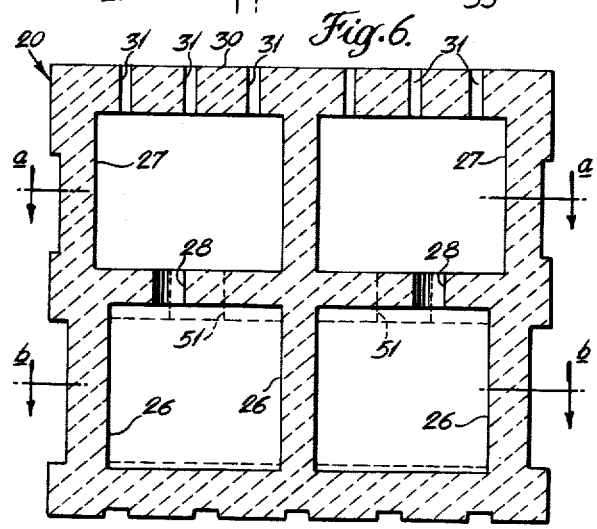
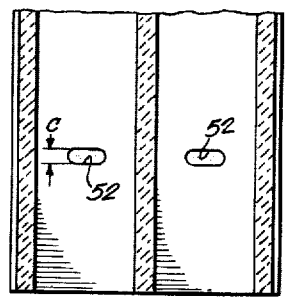
INVENTOR
Mark L. Stuppy
BY
Synnestvedt & Lechner
ATTORNEYS Nov. 12, 1963 M. L. STUPPY 3,110,667
FILTER BOTTOM
Filed Oct. 16, 1959 4 Sheets-Sheet 2
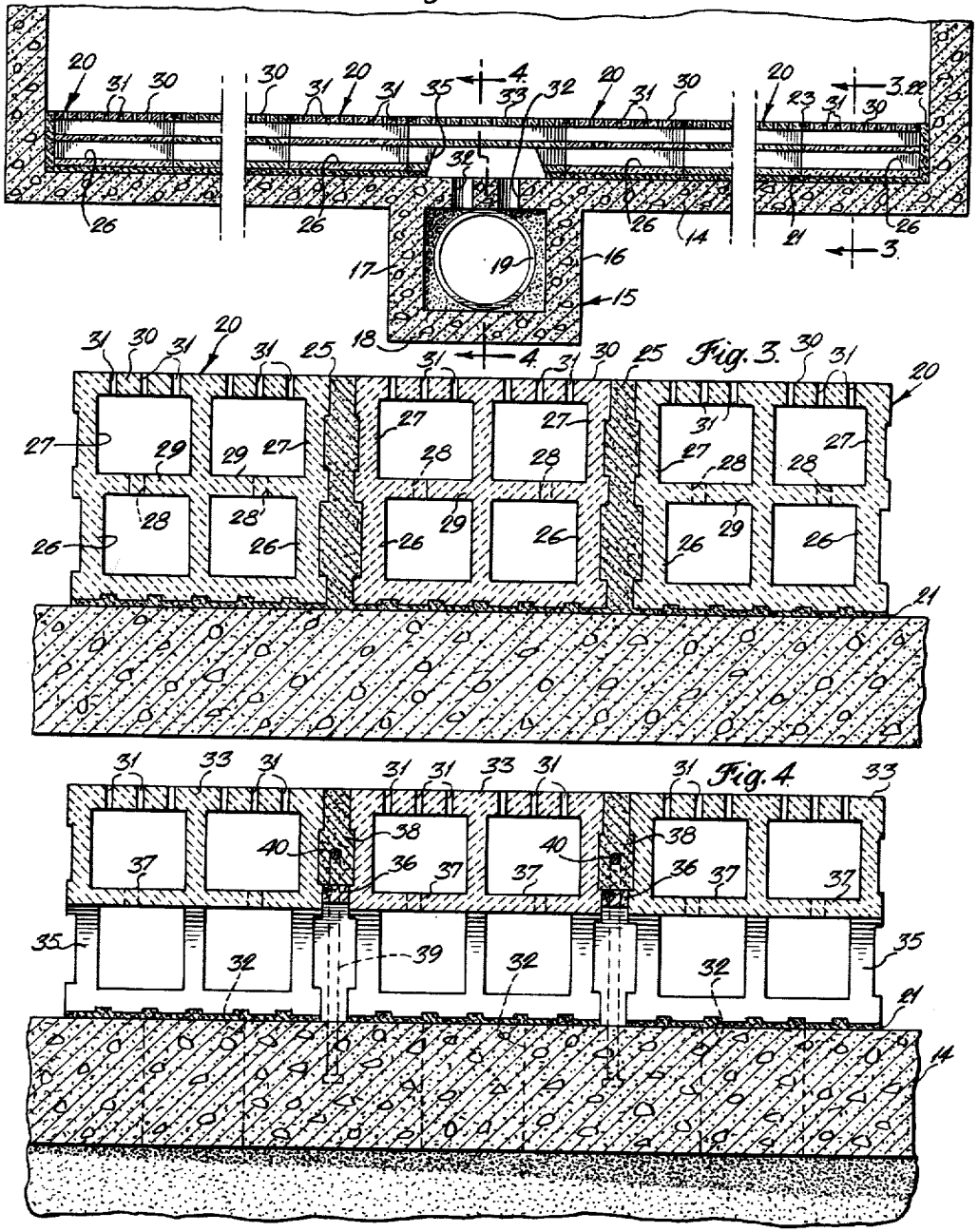
INVENTOR
Mark L. Stuppy
BY
Synnestvedt & Lechner
ATTORNEYS

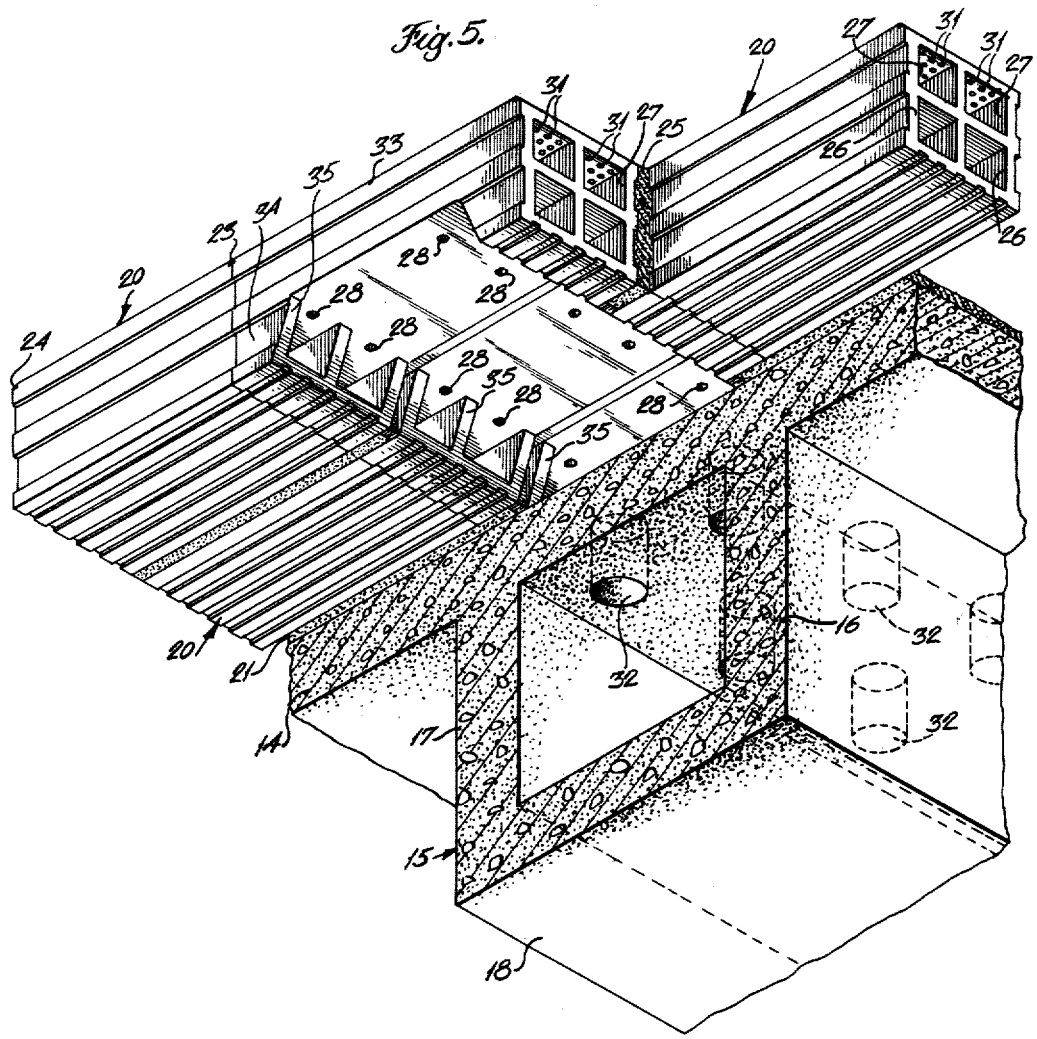

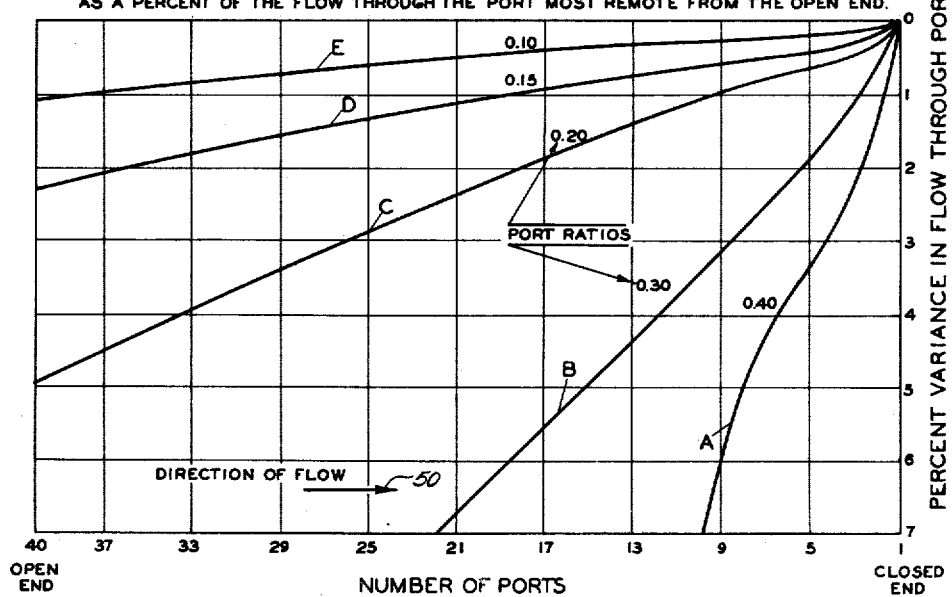
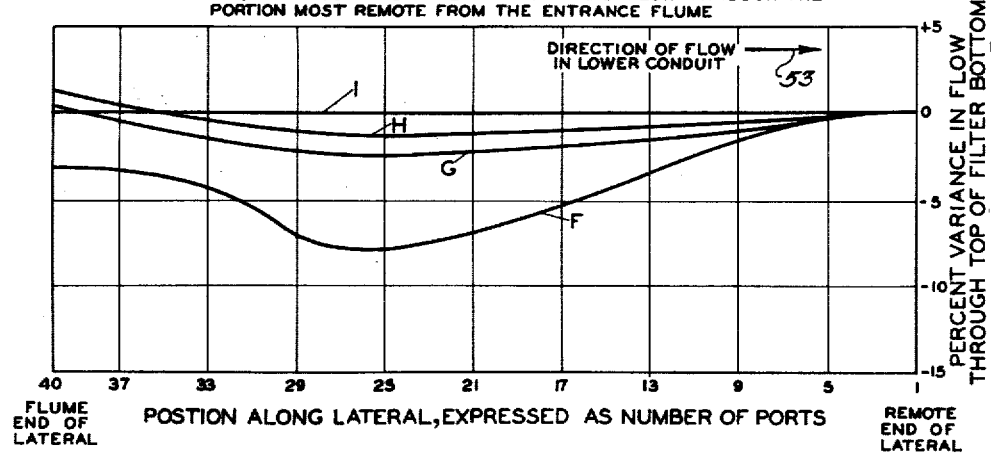

United States Patent Office 3,110,667
Patented Nov. 12, 1963

3,110,667
FILTER BOTTOM
Mark L. Stuppy, Bradford Woods, Pa., assignor to F. B. Leopold Company, Inc., Pittsburgh, Pa., a corporation of Delaware
Filed Oct. 16, 1959, Ser. No. 846,828
8 Claims. (Cl. 210—275)

This invention relates to filter bottoms for use in liquid filters. More particularly, the invention relates to a filter bottom for supporting a bed of finely divided filtering medium, the filter bottom providing liquid flow conduits below the bed of filtering medium, which conduits make possible the collection of filtered liquid and the distribution of a backwash medium. The invention is especially directed to a filter bottom providing a virtually completely uniform distribution of backwash medium throughout the entire filter. The invention has, as is brought out herebelow, a number of special aspects or features, all of which are primarily directed to the establishment and maintenance of an unusually high degree of uniformity of backwash distribution.

Various prior devices have disclosed filter bottoms of the general kind here involved, that is, filter bottoms made up of a plurality of filter blocks having superimposed upper and lower systems of flow passages with ports being provided for the flow of liquid between the upper and lower systems and for the flow of liquid through the top of the filter bottom. Typical of such prior devices is that disclosed in the U.S. patent to Myron, No. 2,378,239, June 12, 1945, assigned to the assignee of the present application. As disclosed in that patent, a plurality of blocks are arranged and secured in parallel adjacent rows to form a filter bottom. Each block includes a lower continuous horizontal conduit through which liquid may pass from block to block in a row, and an upper separate and sealed chamber through which liquid may flow either from above down to the lower conduit or from the lower conduit up through the top of the block. The filter bottom is covered with a bed of relatively coarse aggregate (the particles of which will not pass through the apertures in the top of the block), and several additional beds of graded material of smaller and smaller size. A bed of finely divided filtering medium, such as sand, is placed on top of the beds of coarser particles.

In filters of the kind disclosed in the Myron patent, it is contemplated that the liquid to be filtered, for instance water, coming in from above, will pass downwardly through the filtering medium, the various beds of coarser particles, the apertures through the tops of the blocks, the separate upper chambers, the lower conduits, and out through a take-off flume. Periodically the flow of liquid to be filtered is shut off and a washing medium is forced through the filter in reverse direction, that is, the wash medium (conveniently water) flows from the flume into the conduits which distribute it laterally away from the flume and from the conduits up through the separate upper chambers, the beds of particulate material and so out at the top, thereby carrying off contaminant discharged from the filter.

As shown in the Myron patent, the flume is conveniently centrally located transverse and below the lower conduits of the filter bottom. The blocks of the filter bottom immediately above the flume, which may conveniently be referred to as "bridge blocks" are provided, according to the Myron patent, with central apertures communicating with the flume.

It is here pointed out that the Myron patent is typical of prior filter bottoms in teaching the necessity of breaking up or separating the upper system of flow passages into a large number of individual chambers sealed against interflow among themselves. Such prior devices rely on the flume and the lower conduits to distribute the wash water which then flows upwardly through the chambers and the filter bed in the pattern of distribution established by the flume and lower conduits. Any non-uniformity in distribution established by the flume and lower conduits is necessarily imposed on the wash liquid hitting the bed.

Uniformity of distribution of backwash water in a filter of the kind here involved is extremely important. Lack of uniformity can seriously impair the filtration action of the filter because various portions of the bed may remain contaminated even after backwash. Furthermore, non-uniform distribution of wash water tends to result in the formation of "mud balls," i.e., balls of contaminant which form in small portions of the bed through which minimum backwash water flows. Still further, non-uniform distribution causes "sand boils" and even shifting of the sand layer and drifting or piling up of the sand in some portions. When this occurs, it is necessary to remove the sand and sometimes also the coarser layers and then lay down a completely fresh filter bed.

The "life" of a filter, that is, the number of years of satisfactory operation before the filter bed must be rebuilt, is directly proportional to the uniformity of the distribution of backwash medium. If the variations in backwash from one part of the filter to another are large, the sand and gravel layers are disturbed and mixed in a relatively short time. If the backwash distribution is more nearly uniform, there will be some slight shifting each time the filter is washed, but the cumulative effect may not necessitate rebuilding for quite a few years. By way of illustration, in a filter having variations in backwash distribution as high as about 50%, i.e., the flow of backwash water up through one portion of the bed is 50% of the flow through another portion of the bed, the filter will be disrupted and need rebuilding attention within approximately three years. A filter plant having a backwash variation of about 15% is unlikely to give satisfactory service for more than about a half a dozen years. However, for trouble-free continuous service throughout a relatively long period of time, such as fifty years or more, it is absolutely essential to have backwash variation reduced almost to zero. Variations of even as little as 2 or 3% will give rise to trouble within periods of time much shorter than that made possible by virtually completely uniform distribution.

With the foregoing in mind, the primary object of the invention is the provision of a filter bottom effecting a substantially exactly uniform distribution of backwash liquid throughout the filter.

Related objects of the invention include the provision of a flow-equalizing manifold extended immediately above the entrance flume, the provision of a special and carefully selected port ratio (as defined hereinafter), and the provision of both an upper and a lower system of continuous conduits extending laterally from the region of the flume.

Other objects and advantages of the invention will be clear from the following description referring to the accompanying drawings in which FIGURE 1 is a plan view, with portions shown in section, of a filter bottom constructed according to the invention;

FIGURE 2 is a sectional elevation on an enlarged scale as compared with FIGURE 1 and taken substantially along the line 2, 2 of FIGURE 1;

FIGURE 3 is a sectional view on an enlarged scale as compared with FIGURE 2, taken along the line 3—3, of FIGURE 2, and showing filter blocks according to the invention in cross section;

FIGURE 4 is a sectional view similar to FIGURE 3 but taken substantially along the line 4, 4 of FIGURE 2;

FIGURE 5 is an isometric view of a portion of a filter bottom according to the invention, taken from below, and showing a portion of the flume and manifold means of the invention;

FIGURE 6 is a cross-section on a still further enlarged scale of a block according to the invention, this view also showing in dashed lines the cross-section of a typical prior art block;

FIGURE 7 is a fragmentary horizontal sectional view taken through a block according to the invention above the horizontal partition, this view showing a port shape which is a modification of that shown in previous views;

FIGURE 8 is a graph of a series of curves, one for each of several different port ratios showing variances in port flow; and FIGURE 9 is a graph of a series of curves, one for each of several different types of filter bottoms, showing variations in wash water distribution.

Referring to the drawings in more detail, the filter plant includes end walls 10 and 11, side walls 12 and 13, and bottom wall or floor 14 (see FIG. 2) which, in a typical installation, are formed of concrete. Although other arrangements are sometimes utilized, the drawings illustrate a filter having a flume 15 located mid-way between the side walls 12 and 13 and below the floor 14 of the filter. The flume 15 has side walls 16 and 17 and bottom wall or floor 18 formed of concrete, conveniently integral with the concrete of filter floor 14. An entrance pipe 19 is provided through which filtered water can flow out of the filter and backwash water can flow into the filter.

As best seen in FIGURE 1, the filter bottom is of multi-part construction, being composed of a plurality of individual filter blocks shown generally at 20. These blocks are arranged in parallel adjacent rows and are placed end to end. The blocks are retained in position by means of suitable mortar placed in the form of grout. As best seen in FIGURES 2 and 5, grout 21 underlies all of the blocks, surrounds the border blocks as at 22, fills as at 23 corner pockets 24 formed along the end upper edges of the blocks, and also fills the space between the side walls of the blocks as indicated at 25.

Attention is now turned to the structure of an individual filter block. As seen in FIGURES 2 and 3, each block includes a pair of lower continuous flow passages 26 which extend through the block from end to end and a pair of similar upper continuous flow passages 27 which also extend entirely through the block from end to end. Because of the arrangement of upper and lower flow passages, the assembly of blocks in the filter bottom has a lower system of conduits extending continuously from one side to the other side and, immediately thereabove, an upper similar system of conduits extending continuously from one side to the other. It is here emphasized that no joint plates or gaskets or special end protrusions are provided which would interfere with the free flow of liquid lengthwise along the conduits of the upper system.

Each of the lower conduits 26 is interconnected with an upper conduit 27 by means of a plurality of ports 28 extending through the horizontal or intermediate partition 29. Passage means through the top 30 of each block are provided, conveniently in the form of a plurality of ports 31 of cross-section small enough, with relation to the minimum size of the coarsest aggregate used in the filter bed, to prevent the ingress of coarse filter particles into the interior of the filter bottom.

For the sake of clarity, portions of FIGURE 1 are shown in horizontal section. Thus, the portion indicated by the bracket $a$ is taken roughly in the plane of the line $a, a$ of FIGURE 6 and the portion of FIGURE 1 indicated by the bracelet $b$ is taken roughly in the plane of the line $b, b$ in FIGURE 6. The section included in bracket $a$ of FIGURE 1 clearly illustrates the continuous upper conduits extending from side 12 to side 13 of the filter and also illustrates the ports through the horizontal partition. The portion included in the bracket $b$ of FIGURE 1 illustrates the lower conduits extending continuously from side to side of the filter and also shows the central manifold located directly over the flume.

As will be brought out more fully below, the dimensions of the lower conduits 26 with relation to the dimensions of the ports 28 are carefully selected and controlled according to the invention so as to result in highly desirable and advantageous flow characteristics. However, for the time being, attention is directed to the special bridge blocks of the invention as best seen in FIGURES 2, 4 and 5.

A plurality of apertures 32 are provided through the floor 14 of the filter, these apertures being spaced substantially symmetrically along the length of the flume 15. The apertures 32 provide communication between the blocks of the filter bottom and the interior of the flume. Immediately above the flume, and especially above the apertures 32, there is a series or row of specially formed bridge blocks 33 which are constructed so as to perform an important function of the invention. The lower side walls 34 of the bridge blocks 33 are cut away as at 35 to provide passages permitting flow of liquid between the lower conduits of the bridge blocks. As seen in FIGURE 2, the cut-away 35 is effected so as to provide a slanted surface along the edge of the cut-away portion, the slanted edges on opposite sides being slanted in opposite directions with the greater distance between the slanted surfaces directed downwardly toward the flume 15.

A strip of wood 36 is advantageously inserted between adjacent bridge blocks at about the level of the horizontal partitions 37. The strip of wood 36 acts as a form to contain the grout indicated at 38 which is placed between adjacent bridge blocks. Suitable reinforcing anchors 39, preferably made of steel, are embedded in the floor of the filter and extend upwardly between the bridge blocks. For added strength the upper end 40 of the anchor rod 39 may be bent inwardly over the flume.

The bridge blocks 33, providing as they do for flow of liquid between the lower conduits of the filter bottom immediately above the flume, comprise manifold means which accomplish a substantial evening out of the disuniformity of upflow of liquid through the ports 32 which unavoidably occurs during the inrush of wash water along the flume 15 and up through the filter bottom.

Because of the manifold provided by the bridge blocks, these blocks virtually eliminate unevenness in flow along the length of the flume and insure that each of the lower conduits 26 will be fed with wash water at substantially the same flow rate and pressure.

When the water introduced by the flume 15 has passed upwardly through the holes 32 and through the manifold provided by the bridge blocks 33, the water then runs laterally outwardly down the length of the lower conduits 26. There is, unavoidably, some unevenness of flow distribution down the length of each lateral conduit 26. This unevenness shows up in uneven flow through the ports 28 spaced down the length of the conduit 26. This unevenness in flow can be substantially reduced by proportioning the ports 28 and conduits 26 according to the present invention. The importance of this aspect of the invention is brought out in the graph of FIGURE 8 and attention is turned thereto.

The variance in flow through a series of identical ports spaced equally along a conduit closed at one end depends on the relationship between the dimension of the ports measured along the length of the conduit (that is, in the direction of liquid flow down the conduit) and the dimension of the conduit flow passage measured along a line transverse to the direction of flow in the conduit and passing through the center of a port as well as through the central axis of the conduit. Stated in another way, assuming a horizontal conduit of circular cross-section having circular ports along the top thereof, the variance in liquid flow through the ports down the length of the conduit is related to the ratio of the port diameter to the conduit diameter. If the cross-sectional shape of the conduit and ports is non-circular (but the conduit is still maintained horizontal and the ports are located through the top thereof), then the variance in flow is related to the ratio of the port dimension measured parallel to the direction of liquid flow in the conduit to the height of the conduit measured vertically and below the center of the port.

I have called this ratio the "port ratio." When the term "port ratio" appears herein, it is to be understood to refer to the ratio just defined. As an illustration, if a horizontal conduit having a flow passage which measures 3" in height below the center of a port is provided with ports which measure 1" in direction parallel to the liquid flow in the conduit, then the port ratio would be 0.33.

FIGURE 8 is a plot of flow variance against number of ports for a horizontal circular conduit having circular ports spaced approximately on one foot centers along the top. As indicated in FIGURE 8, the left side of the graph can be thought of as the open end of the conduit and the right side of the graph can be thought of as the closed end. Liquid flow down the conduit is from left to right as indicated by the arrow 50. The variance in flow is expressed as a percent of the flow through the port most remote from the open end. Thus, as shown in FIGURE 8, when there is only one port, the percent variance in flow is zero for all of the curves shown. Assuming a port ratio of 0.40, curve A is a plot of flow variance down the length of the conduit. It is seen that curve A slopes off sharply. The percent variation in flow inrceases extremely rapidly as the number of ports increases. Seven percent variation in flow is reached at about the tenth port from the closed end of the conduit.

Curve B in FIGURE 8 represents the performance of a ported conduit having a port ratio of 0.30. Similarly, curves C, D and E illustrate the flow characteristics along ported conduits having port ratios 0.20, 0.15 and 0.10 respectively.

Although the curves of FIGURE 8 are plotted for circular conduits and circular ports, they are directly applicable, without the introduction of significant error, to conduits of rectangular section and circular ports of the kind illustrated in FIGURES 1 to 6 of the drawings.

From an analysis of FIGURE 8, it is seen that reducing the port ratio can effect a substantial improvement in the flow performance of a filter bottom. There are, basically, two ways by which this can be done, the first being to reduce the size of the port, and the second being to increase the height of the lower conduit. However, various practical considerations establish effective limits to the degree to which either of these alternatives can be followed.

FIGURE 6 illustrates a cross-section through the block according to the invention. Superimposed on the full-line drawing of the block according to the invention in FIGURE 6 is a dashed line showing of the variations from the cross-section which are prevalent in prior constructions, for example the Myron patent above referred to. Prior to the invention herein, it was thought desirable to have the ports in the horizontal partition relatively large so as to minimize head loss during flow through the horizontal partition. Note that the ports shown in dashed lines at 51 are of larger diameter than the ports 28 shown in full lines.

According to the invention, the diameter of the ports is reduced somewhat and, at the same time, the height of the lower conduit 26 is increased somewhat both upwardly and downwardly, as clearly appears in FIGURE 6. The port ratio of the prior type of block shown in dashed lines in FIGURE 6 is approximately 0.32. This is a typical port ratio of prior filter bottoms. A port ratio of 0.32 would result in a curve in FIGURE 8 near to but slightly below curve B and would result in a relatively large variance in flow down the length of the lateral conduit.

Although the structural changes in port size and conduit size illustrated in FIGURE 6 may not at first glance seem to be significant, they are actually of considerable importance. They result in a reduction in the port ratio to a figure somewhat below 0.20, which would yield a relatively flat curve somewhere between curves C and D of FIGURE 8. This means that, by means of the structural changes indicated in FIGURE 6, performance can be improved from a curved falling between curves A and B to a curve falling between curves C and D of FIGURE 8.

If still further improvement in the port ratio is desired, this can be effected without excessive reduction in the total cross-sectional flow area through the horizontal partition by the use of oblong ports such as 52 shown in FIGURE 7. Note that the long dimension of the oblong ports is oriented transverse the lower conduits. Since it is the dimension measured lengthwise of the conduits, as indicated at $c$ in FIGURE 7, which is utilized in calculating the port ratio, a low port ratio can be obtained while still maintaining a substantial total flow area through the ports. Naturally, if the flow area through the ports is reduced excessively, the result is to severely increase the head loss occurring during flow through the horizontal partition and thereby impair the overall efficieny of the filter.

Theoretically and ideally, from the standpoint of flow variance as affected by port ratio, the ports would be formed as a series of parallel narrow slits running entirely across the lower conduits 26. However, such an arrangement of ports is not feasible from a practical production standpoint. Very satisfactory results can be obtained, on a practical basis, by the selection of a port ratio not more than about 0.20 since this yields, in a lateral of forty ports length (which could conveniently be forty feet long, with a port each foot of length) not more than about 5% flow variance. Although the curves of FIG. 8 are plotted for ports spaced one foot from each other, these curves are substantially accurate for spacings varying therefrom to a limited degree. Ports spaced apart from about nine inches to about fifteen inches would exhibit flow characteristics substantially similar to those of FIG. 8. However, excessive departure from the spacing of FIG. 8 would result in substantial changes in flow characteristics.

According to the feature of the invention discussed above, which relates to the provision of a system of continuous upper conduits, flow variance through the ports in the horizontal partition of the order of about 5% can be substantially completely eliminated during flow through the upper system of conduits with the result that the flow variance out the top of the blocks is so small as to be insignificant. For this reason, it is not necessary to adopt extreme configurations of ports and lower conduits in an effort to obtain port ratios as close to zero as possible. On the contrary, it is possible to adopt practical production port ratios of up to about 0.20 without introducing flow variance sufficient to upset the perfection of wash water distribution which is desired.

Attention is now turned to the curves shown in FIGURE 9. These curves are of a somewhat different nature than those shown in FIGURE 8. While FIGURE 8 relates to the flow variances present immediately above the ports in the horizontal partition, FIGURE 9 relates to the flow variances present immediately above the top of the filter bottom, that is after the wash liquid has passed upwardly through the top of the filter bottom and into the filter bed. Furthermore, the curves of FIGURE 9 represent actual performance characteristics of filter bottoms utilizing blocks having lower conduits of rectangular section and ports of circular section. The left side of FIGURE 9 represents the flume end of the lateral and the right side of FIGURE 9 represents the remote end, that is the end of the lateral adjacent the side of the filter. The direction of flow is from left to right as indicated by the arrow 53. Curve F represents the performance of a filter bottom according to the prior art, for example according to the Myron patent. Such a filter bottom would typically include ports and lower conduits proportioned as indicated by the dashed lines in FIGURE 6 which would result in a port ratio of about 0.32. The type of filter bottom which would yield a curve like F would have a plurality of individual upper chambers instead of the continuous upper conduits of the invention.

As seen in FIGURE 9, curve F dips down sharply to a flow variance of about 8%.

Curve G of FIGURE 9 illustrates the performance of a filter bottom embodying one of the features of the present invention, namely, a configuration of port and lower conduit such as to yield a port ratio of not more than 0.20. However, the filter bottom of curve G does not have the system of continuous upper conduits of the invention but, instead, has a plurality of individual chambers. It is seen that curve G is a substantial improvement over curve F and results in a maximum flow variance of about 2½%.

Curve H would result from yet another filter bottom construction which would have a disadvantageous port ratio similar to that of the filter bottom of curve F. However, the filter bottom of curve H does include the system of continuous upper conduits according to the invention. It is seen that curve H represents performance characteristics even somewhat better than those of curve G. However, the maximum flow variance of curve H is still over 1%.

Curve I, which is actually the zero percent abscissa, results from a filter bottom embodying all of the above-discussed features of the invention. The filter bottom of curve I has an advantageous port ratio of not more than 0.20, and it includes upper continuous conduits.

From the foregoing it is seen that, while maximum advantage results from the adoption of all of the special features of the invention, adoption of any of the features results in a significant improvement in performance characteristics.

What is claimed is:

1. For use in a filter adapted to filter a liquid during flow thereof through the filter in normal direction and to permit reverse flow of a wash medium, a filter bottom comprising a plurality of filter blocks arranged in parallel adjacent rows, each block having upper and lower horizontal flow passages therethrough, the upper flow passages of the blocks in each row being in end-to-end communication with one another to provide a series of individual, parallel and continuous upper flow conduits each of which extends from one side of the filter bottom to the opposite side, said upper conduits providing for liquid flow horizontally along the length of each upper conduit but substantially preventing transverse horizontal flow between upper flow passages, the lower flow passages being similarly arranged in end-to-end communication with one another to provide lower flow conduits which are oriented parallel to the upper conduits, ports interconnecting the upper and lower conduits, and passage means through the top of the filter bottom in communication with the upper conduits.

2. A construction according to claim 1 in which a plurality of identical ports interconnect each lower conduit with an upper conduit, said ports being equally spaced in a straight line parallel to the conduit length, and in which the port size and the height of the lower conduit are predetermined, with relation to each other, so that the ratio of the port dimension taken in the direction of flow along the lower conduit to the height of the lower conduit establishes desired maximum differences in flow through the ports along the length of a lower conduit.

3. A construction according to claim 2 in which the ports are of oblong plan shape with the long dimension oriented transverse the lower conduits.

4. A filter bottom according to claim 2 in which the ratio of the port dimension taken in the direction of flow along the lower flow passage to the height of the lower flow passage is not more than about 0.20.

5. A filter bottom for a liquid filter, said filter bottom comprising a plurality of filter blocks arranged in parallel adjacent rows, said rows of blocks extending substantially throughout the entire filter and supporting a bed of finely divided filtering medium adapted to filter a liquid during downflow through the bed and to permit the removal of contaminate material during upflow of a wash medium, each block having upper and lower horizontal flow passages therethrough, the upper flow passages of the blocks in each row being in end-to-end communication with one another to provide a series of individual, parallel and continuous upper flow conduits each of which extends from one side of the filter bottom to the opposite side, said upper flow conduits providing for liquid flow horizontally along the length of each upper flow conduit but substantially preventing transverse horizontal flow between upper flow conduits, the lower flow passages being similarly arranged in end-to-end communication with one another to provide lower flow conduits whose longitudinal axes are oriented parallel to the longitudinal axes of the upper flow conduits, a plurality of ports interconnecting each lower flow conduit with an upper flow conduit, said ports being equally spaced in a straight line parallel to the conduit length, the ratio of the port dimension taken in the direction of flow along the lower flow conduit to the height of the lower flow conduit being not more than about 0.20, passage means through the tops of the blocks in communication with the upper flow conduits, a flume extending the full distance between opposite sides of the filter, said flume being oriented transverse the lower flow conduits, a partition between the interior of the flume and the interior of the lower flow conduits, each of the lower flow conduits being in communication with the flume through aperture means in said partition, the side walls of the lower flow conduits of the row of blocks immediately adjacent said flume being cut away to provide a flow manifold interconnecting the lower flow conduits, and means for feeding wash medium into the flume and effecting flow thereof through the manifold and lower flow conduits and upwardly through the upper flow conduits and the filter bed.

6. In a filter of the kind having a bed of finely divided filtering medium adapted to filter a liquid during downflow through the bed and to permit the removal of contaminate material during upflow of a wash medium, a filter bottom underlying substantially the entire bed and providing for the collection of filtered liquid and the distribution of wash medium, said filter bottom being made up of a plurality of filter blocks providing a series of horizontal, individual, parallel and continuous lower flow conduits each of which extends from one side of the filter bottom to the opposite side and a series of similar upper flow conduits each of which similarly extends from said one side of the filter bottom to said opposite side, said upper flow conduits providing for liquid flow horizontally along the length of each upper conduit but substantially preventing transverse horizontal flow between the upper conduits, ports connecting the upper flow conduits with the lower flow conduits, and passage means through the tops of the filter blocks.

7. A filter according to claim 6 and further including a flume extending the full distance between opposite sides of the filter, said flume being oriented transverse the lower flow conduits, partition means between the interior of the flume and the interior of the lower flow conduits, each of the lower flow conduits being in communication with the flume through aperture means in said partition means, the side walls of the lower flow conduits of the row of blocks immediately adjacent said flume being cut away to provide intercommunication between the lower flow conduits adjacent the flume.

8. A filter bottom for a liquid filter, said filter bottom comprising a plurality of filter blocks arranged in parallel adjacent rows, said rows of blocks extending substantially throughout the entire filter and supporting a bed of finely divided filter medium adapted to filter a liquid during downflow through the bed and to permit the removal of contaminate material during upflow of a wash medium, each block having upper and lower flow passages therethrough, the lower flow passages of the blocks in each row being in end-to-end communication with one another to provide lower horizontal flow conduits, a plurality of ports interconnecting the lower flow passages with the upper flow passages, passage means through the tops of the blocks in communication with the upper flow passages, a flume extending the full distance between opposite sides of the filter, said flume being oriented transverse the lower horizontal flow conduits, a partition between the interior of the flume and the interior of the lower flow conduits, the lower flow conduits being in communication with the flume through aperture means in said partition, the side walls of the lower flow passages of the blocks immediately adjacent said flume being cut away to provide a flow manifold interconnecting the lower flow conduits, and means for feeding wash medium into the flume and effecting flow thereof through the manifold and lower flow conduits and upwardly through the upper flow passages and the filter bed.

References Cited in the file of this patent

UNITED STATES PATENTS

| | | |
|---|---|---|
| 1,698,079 | Wagner | Jan. 8, 1929 |
| 2,378,239 | Myron | June 12, 1945 |
| 2,499,325 | Miller | Feb. 28, 1950 |

UNITED STATES PATENT OFFICE
CERTIFICATE OF CORRECTION

Patent No. 3,110,667                        November 12, 1963

Mark L. Stuppy

It is hereby certified that error appears in the above numbered patent requiring correction and that the said Letters Patent should read as corrected below.

Column 3, line 74, for "bracelet" read -- bracket --; colulm 9, line 9, for "filter", first occurrence, read -- filtering --.

Signed and sealed this 21st day of April 1964.

(SEAL)
Attest:
ERNEST W. SWIDER

Attesting Officer

EDWARD J. BRENNER
Commissioner of Patents